United States Patent [19]
Johnson, Jr.

[11] Patent Number: 5,394,824
[45] Date of Patent: Mar. 7, 1995

[54] THERMOCHROMIC SENSOR FOR LOCATING AN AREA OF CONTACT

[76] Inventor: Lawrence F. Johnson, Jr., 1436 Campana Ave., Hermosa Beach, Calif. 90254

[21] Appl. No.: 208,061

[22] Filed: Mar. 8, 1994

Related U.S. Application Data

[63] Continuation of Ser. No. 957,139, Oct. 7, 1992, abandoned.

[51] Int. Cl.$^6$ .................. G01K 11/12; F41J 5/00; A63C 19/06
[52] U.S. Cl. .................. 116/203; 116/207; 116/216; 273/31; 273/348.1; 273/29 R
[58] Field of Search .................. 116/203, 207, 216; 273/29, 31, 50, 348.1, 378, 411; 374/162

[56] References Cited

U.S. PATENT DOCUMENTS

| | | | |
|---|---|---|---|
| Re. 32,842 | 1/1989 | Wigoda | 273/31 |
| 3,617,374 | 11/1971 | Hodson et al. | 374/162 X |
| 4,410,283 | 10/1983 | Dubois et al. | 374/162 |
| 4,433,637 | 2/1984 | Buirley et al. | 116/207 |
| 5,242,830 | 9/1993 | Argy et al. | 116/203 X |

FOREIGN PATENT DOCUMENTS

92/4083  3/1992  WIPO .................. 273/29 R

Primary Examiner—William A. Cuchlinski, Jr.
Assistant Examiner—Willie Morris Worth
Attorney, Agent, or Firm—Lee W. Tower

[57] ABSTRACT

A thermochromic sensor for locating the area of contact between two surfaces moving in relation to each other, has applications in boundary line officiating and other situations where the location of the area of contact is important. For tennis and similar sports, thermochromic sensors are placed along boundary lines. The thermochromic sensors can be formed with thermochromic liquid crystals, which change color in the area of contact, thereby accurately indicating where a ball contacted the court. The color change can be used to characterize the speed of the impact. A temperature controller can be built into the sensor or placed near the sensor to maintain the temperature of the sensor near the sensor trigger point—the point at which a color change will occur on contact.

9 Claims, 5 Drawing Sheets

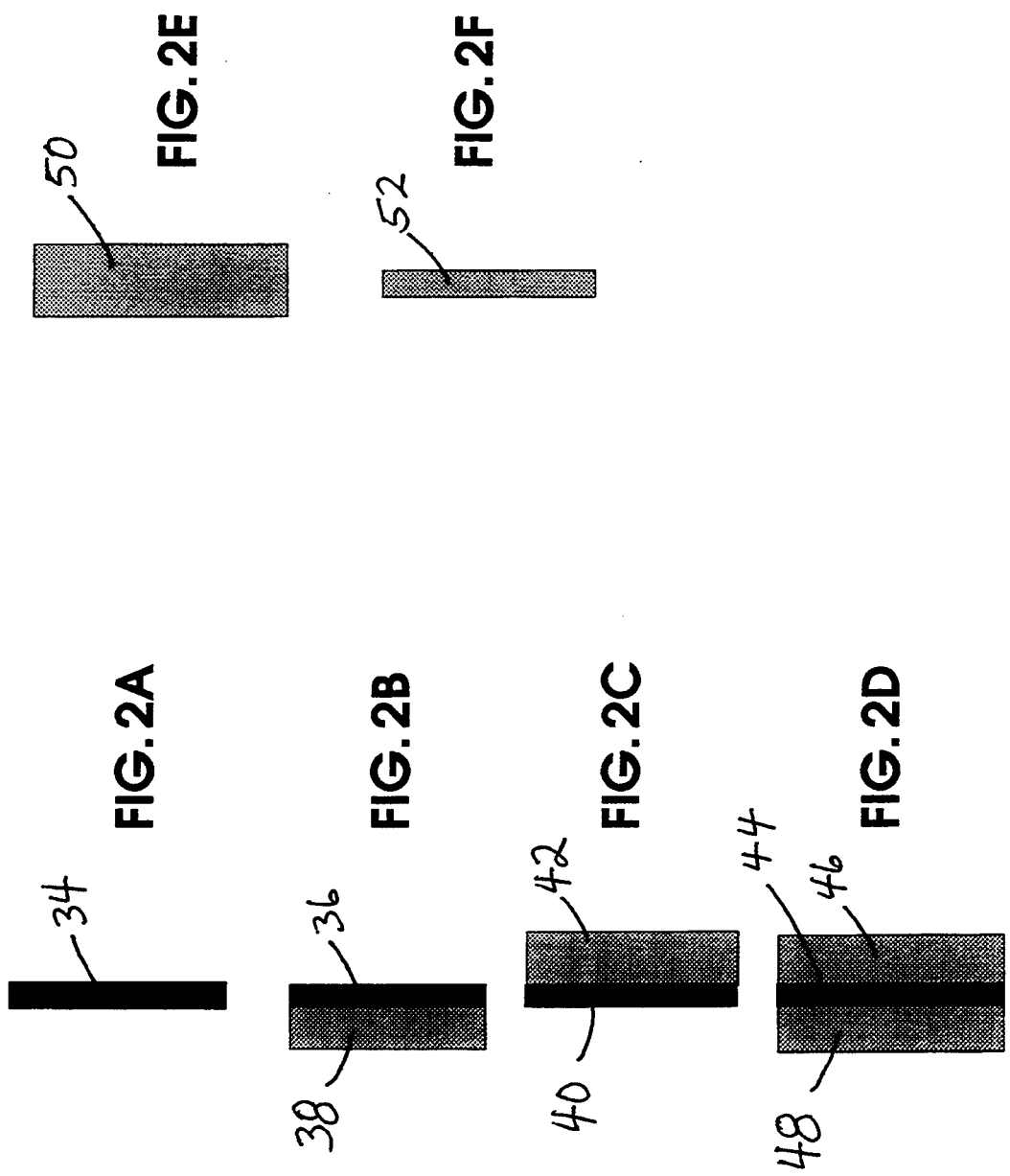

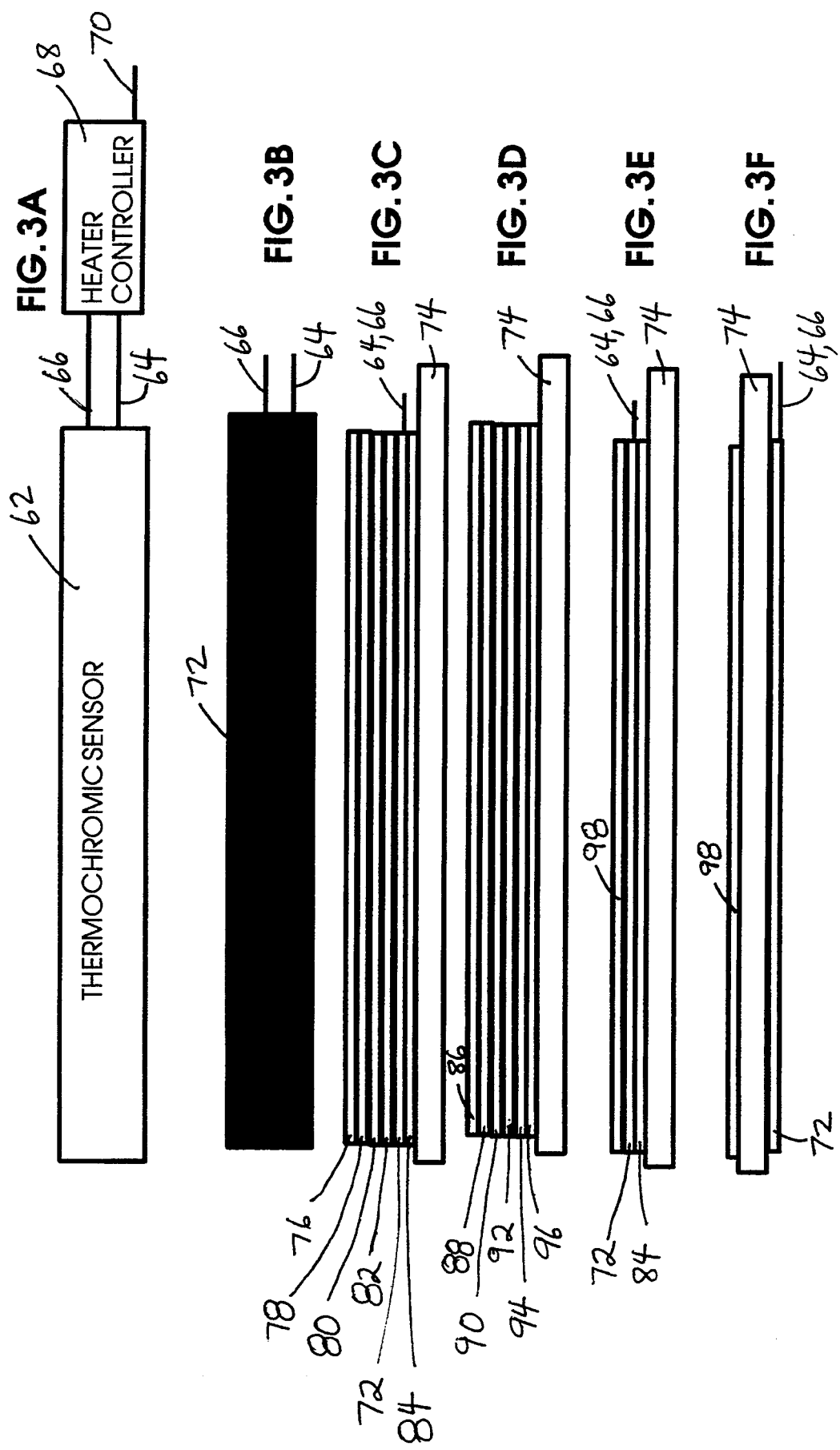

THERMOCHROMIC SENSOR FOR LOCATING AN AREA OF CONTACT

CROSS-REFERENCE TO RELATED APPLICATION

This is a continuation of application Ser. No. 07/957,139, filed Oct. 7, 1992, now abandoned.

BACKGROUND OF THE INVENTION

1. Field of the Invention

This invention relates to improving the state of the art of locating the area of contact between two surfaces moving in relation to each other. The invention also relates to improving boundary line officiating in games, such as tennis, and to characterizing the speed of impact of a projectile such as a tennis ball hitting a tennis court.

2. Prior Art

Many games, such as tennis, depend on proper boundary line officiating; however, often boundary line calls are difficult to make. In tennis, line calls are made continually as to whether a ball has landed in bounds, on a line, or out of bounds. In tennis a ball can reach velocities of 100 miles per hour or greater, which makes it very difficult for the human eye to place the area of contact on the court. Fast moving balls usually have a low aspect angle and often the ball skids on the court before bouncing up from the court, all in a very short time interval. Locating the area of contact of the tennis ball with the court with accuracy is a constant point of controversy in tennis.

In the prior art there are a number of patents that have addressed the problem of improving the state of the art of boundary line officiating. For example, U.S. Pat. No. 5,059,944 to Carmona uses an optical system for detecting and signaling an out-of-bounds ball. In that invention, optical sensor units consisting of emitter and receptor units are configured around the court and an out-of-bounds ball is signaled by an audiovisual device. There are other versions of optical sensor systems for boundary line officiating, including Wilson, U.S. Pat. No. 4,422,647, that use light beams.

There are a number of devices that use electrical/electronic sensors for improving boundary line officiating. For example, U.S. Pat. No. 4,840,377 to Bowser uses sensors that contain piezoelectric film conductors that are placed along boundary lines. On the impact of a ball the piezoelectric film creates a voltage, which is sent to a controller that communicates to a line judge whether a ball has struck a boundary line. Other devices using electrical sensors include: Harrop U.S. Pat. No. 4,855,711 that uses sensors that when compressed generate an electrical impulse; Gray U.S. Pat. No. 4,664,376 in which the ball is modified to have metal material in it so that electromagnetic fields placed in the court are disturbed when the ball is nearby thereby sensing the location of the contact; Supran U.S. Pat. No. 4,432,058 that uses an electrically conductive tennis ball which makes and breaks electrical circuits when bouncing on them; Berger U.S. Pat. No. 5,082,263 that has a tennis ball with a radar reflecting element that is then tracked with a radar; Van Auken U.S. Pat. No. 4,859,986 that has in and out of bounds circuits which can be completed by the touchdown of a conductive game ball; and Levine U.S. Pat. No. 4,365,805 that has a plurality of laminated, pressure sensitive contact type switches that are closed by pressure of a ball or foot impact.

All of these sensors have in common that the ball contact with the surface of the court is sensed or tracked and then remotely signaled to an official who then calls the play based on a combination of what he saw visually and what the sensor indicates. The official has additional information, but unfortunately there is still room for ambiguity, so calls will still be in controversy in these systems.

Thermochromic liquid crystals have been used in the prior art for temperature indication/measurement, medical thermography, nondestructive testing, radiation detectors, and for aesthetics. In the area temperature indication/measurement the uses include digital thermometers and heat warning indicators. In the area of medical thermography one use is for breast cancer detection. In the area of nondestructive testing one example is fault detection in electronic components. In the area of radiation detectors the uses include thermal imaging. Aestetic uses include advertising, decoration, jewellery, badges, fabrics and clothing. None of the prior art uses thermochromic liquid crystals to locate an area of contact.

What is needed is a sensor that indicates the area of contact of an object, such as a tennis ball, with a surface, such as a court, directly on the surface at the area of contact, as opposed to some remote signaling device. With this type of system, the players and the officials could all "see" the area of contact. The audience could also "see" the area of contact, possibly via television. Whether the area of contact is in or out of bounds, having a sensor that indicates directly where on the court the area of contact occurred would greatly increase the reality of the line calls and the "participation" in line calls, which would make the line calls better and improve the game for all parties involved. Such a system would remove the mystery of remote sensors and avoid some of their disadvantages which include modified balls that would change the game, expensive equipment that must be installed at each court, and the associated training to use the equipment and maintain it.

Another feature that is needed is to be able to characterize the speed of the impact of a projectile. In tennis this could be used to characterize the speed of a serve, for example. The prior art generally does not address this aspect; however, the devices that use radar could measure speed, but radar by its nature emits dangerous radiation. A method to characterize speed without such dangers would be a significant improvement.

SUMMARY OF THE INVENTION

The object of the present invention is a sensor for locating the area of contact between two surfaces moving in relation to each other. In the case of a ball striking a court, the invention operates by presenting a mark visible to the human eye on the area of the court that is contacted by the moving ball. In sports such as tennis this will significantly increase the accuracy of line calls. Another object of the invention is to allow officials to distinquish between ball contacts and foot impacts. Another object of the invention is a sensor system that can be easily observed by all the participants including the officials, players and audience. Another object of the invention is a system that can characterize the speed of impact.

For tennis and similar sports, the invention has thermochromic sensors placed along boundary lines. The thermochromic sensors can be formed of thin material coated with thermochromic liquid crystals. It is also possible to apply the thermochromic sensor directly on the surface of the court by applying thermochromic liquid crystals directly on the surface of interest. The thermochromic sensors are sensitive to temperature changes. On a game court, such as a tennis court, the temperature change resulting from the friction caused by a ball contact causes a change in the color of the thermochromic sensor, which indicates very accurately where the ball contacted the court. The temperature of the tennis court and/or the ball is not the subject of interest in this application and the temperature of the tennis court and/or the ball are not displayed as color changes in the thermochromic sensor. Only the area of contact is the subject of interest and only the contact causes a change in the color of the thermochromic sensor in the area of contact. This is different than the prior art, which has focussed on measuring the temperature of objects.

The color change depends on the temperature change, and since this is directly proportional to the speed of the impact, the color change can be used to characterize the speed of the impact. Afterwards, the liquid crystals return to their previous temperature, but there is enough time for the ball contact print to be visually detected by boundary line officials to make a call.

The liquid crystal thermochromic material is encapsulated in tiny bubbles of gelatin, which are sprayed, screenprinted or painted onto the strips of thin material or directly onto the surface of interest, such as a tennis court. The color of the liquid crystal thermochromic material depends on the temperature. As the material warms up, it goes from being invisible to being deep red, and then advances with higher temperature through the spectrum to green and blue. The molecules of the liquid crystals are arranged in spiral stacks, and the color is determined by the pitch of this spiral—the length in which it makes one complete turn. As the temperature rises, the spiral twists and the pitch gets shorter. The crystal reflects only light with a wavelength the same as the pitch of the spiral.

There are also single color, monochromatic liquid crystals, which reflect light of a virtually constant color at all temperatures below a trigger point temperature. Above the trigger point temperature the material becomes transparent. Since the liquid crystal is usually used over a black background the effect is to change from a color below the trigger point temperature to black at temperatures above the trigger point. This type of liquid crystal is useful for determining the area of contact, but not for characterizing the speed of impact.

The print of a ball contact would be easily distinquishable from a foot print, because the friction caused by a foot landing on a court would be quite different than the frictional heat caused by a ball moving at up to 100 miles an hour hitting a court and because foot prints have a different shape. If a ball landed on a ball print that had not yet faded, it would have to overlap exactly and duplicate the temperature change of the first mark for the second mark to be indistinguishable, which is unlikely.

Another object of the invention is to provide a design that can operate over a large ambient temperature range. One approach is to have a temperature controller built into the sensor or near the sensor, which would maintain the temperature of the sensor near the sensor trigger point—the point at which a temperature rise causes the sensor material to become visible. Another object of the invention is to have a plurality of layers of the liquid crystal thermochromic material with each layer having a different trigger point. This would allow the sensor to operate over a large ambient temperature range without a temperature controller. Another object of the present invention is to have normal appearing boundary lines to maintain the traditional character of the game.

BRIEF DESCRIPTION OF THE DRAWINGS

A better understanding of the invention and its advantages will be apparent from the detailed description taken in conjunction with the accompanying drawings in which:

FIG. 2A is a segment of a normal boundary line.

FIG. 2B is a segment of a boundary line with a thermochromic sensor on the boundary line and in bounds of the boundary line.

FIG. 2C is a segment of a boundary line with a thermochromic sensor on the boundary line and out of bounds of the boundary line.

FIG. 2D is a segment of a boundary line with a thermochromic sensor on the boundary line and in bounds and out of bounds of the boundary line.

FIG. 2E is a segment of a wide thermochromic sensor boundary line extending in bounds.

FIG. 2F is a segment of a normal width thermochromic sensor boundary line.

FIG. 3A is a top view of a temperature controlled thermochromic sensor according to the present invention.

FIG. 3B is a top view of a temperature control grid according to the present invention.

FIG. 3C is a cross section of a temperature controlled stacked thermochromic sensor layers according to the present invention.

FIG. 3D is a cross section of stacked thermochromic sensor layers without temperature control according to the present invention.

FIG. 3E is a cross section of a temperature controlled thermochromic sensor according to the present invention.

FIG. 3F is a cross section of a temperature controlled thermochromic sensor with the temperature controller under the court according to the present invention.

DESCRIPTION OF THE PREFERRED EMBODIMENTS

Figure 1:
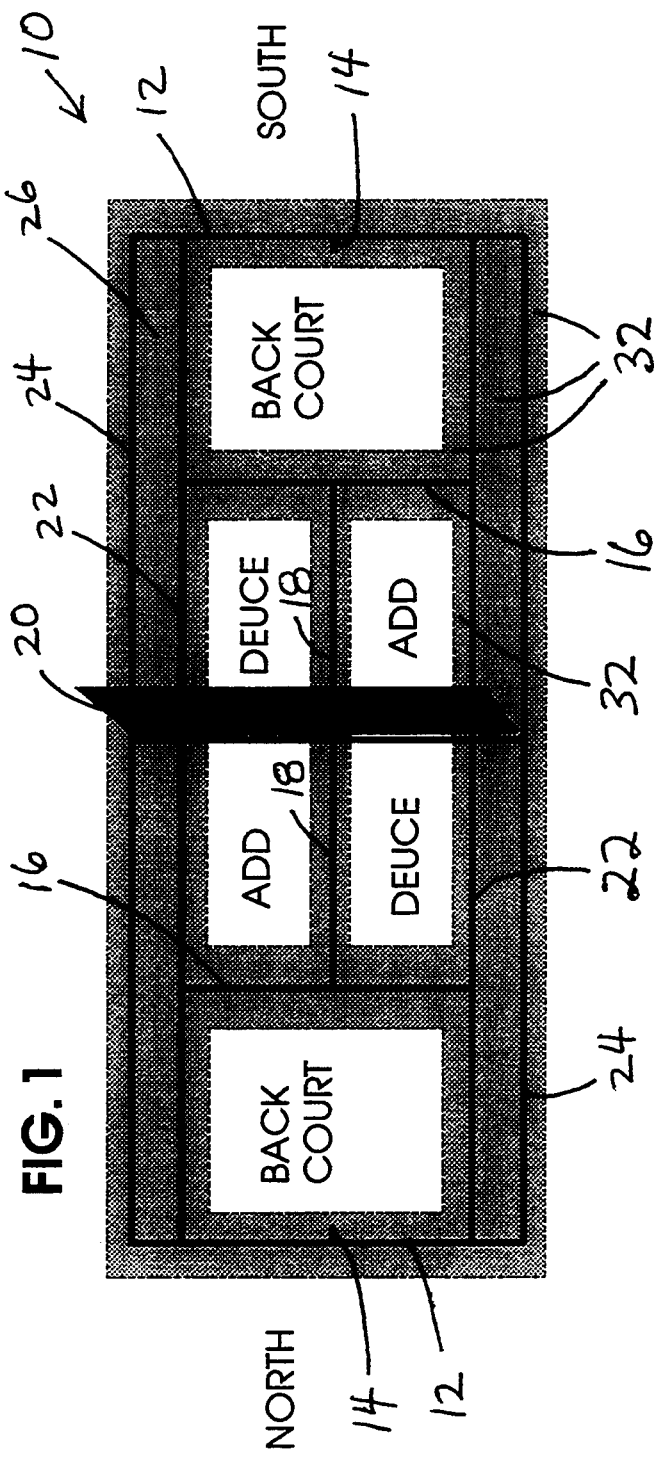
FIG. 1 is a view of a tennis court having a thermochromic sensor according to the present invention.

Referring now to the drawings, and more particularly, to FIG. 1, there is shown a tennis court having a thermochromic sensor for area of contact locating 10 according to the present invention. The tennis court has the standard boundary lines and equipment including: base line 12, center stripe 14, service line 16, center service line 18, net 20, single side line 22, double side line 24, double alley 26, North Side, South Side, ADD areas, DEUCE areas, and Back Court areas. The rules of the game are well known and will not be explained here; however, for example, when the player on the South Side is serving, the player stands behind base line 12 and to the right of center stripe 14 and must serve the ball so that it lands in the DEUCE area on the North Side court, which is bounded by service line 16, center service line 18, double side line 24 and the net 20. It is critical to call properly whether the served ball lands in the DEUCE area or out of the DEUCE area. The call is complicated by the fact that if the ball lands directly on one of the boundary lines bounding the DEUCE area, then the ball is in bounds.

As shown in FIG. 1, a thermochromic sensor 32 is placed on the court near all of the boundary lines. In the configuration shown in FIG. 1, if the ball call is in doubt on the serve, because, for example, the ball landed on or near the service line 16 or went past service line 16 or out of bounds, then it is a simple matter for the official to inspect the thermochromic sensor 32 near the point of impact to observe the location of the actual area of contact.

The actual configuration of the thermochromic sensor 32 placement is variable. For the example just given, it would be possible to have the thermochromic sensor 32 only on the service line 16, the center service line 18, the double side line 24 and within the DEUCE area. If the official finds no ball mark on these lines or in the DEUCE area, then the ball must have been "long" or out of bounds. Conversely, it would be possible to have the thermochromic sensor 32 only on the boundary lines service line 16, double side line 24, and center service line 18 and slightly beyond the boundary lines on the out of bounds side. If the official finds no ball mark slightly beyond the boundary lines on the out of bounds side, but it is known that the ball landed near or over the line, then the ball must have been in bounds in the DEUCE area.

The thermochromic sensor 32 is formed from liquid crystal thermochromic material that is encapsulated in tiny bubbles of gelatin, which are sprayed, screen-printed or painted onto the strips of thin material. As explained previously, the color of the liquid crystal thermochromic material depends on the temperature. As the material warms up, it goes from being invisible to being deep red, and then advances with higher temperature through the spectrum to green and blue. The molecules of the liquid crystals are arranged in spiral stacks, and the color is determined by the pitch of this spiral—the length in which it makes one complete turn. As the temperature rises, the spiral twists and the pitch gets shorter. The crystal reflects only light with a wavelength the same as the pitch of the spiral. Normally the liquid crystals are applied over a black background to absorb the unreflected colors.

Such thermochromic liquid crystals are made by Merck Industrial Chemicals, Poole, England. The red start temperature can be adjusted anywhere between −30 degrees C. and 100 degrees C. and the temperature difference width between red and blue can be adjusted to be as narrow as 1 degree C. to a width of about 20 degrees C. The sensitivity of the thermochromic liquid crystals make them especially suitable to characterizing the speed of the impact. A red color corresponds to a lower temperature and therefore a lower speed of impact. A blue color corresponds to a higher temperature and therefore a higher speed of impact. The speed of the impact includes the relative speed caused by any spin on one object. For example, a low angle ball with a high rate of reverse spin would have a higher relative speed than a ball hit with forward spin with comparable speed and therefore would display a high speed of impact.

Merck also makes single color, monochromatic liquid crystals, which reflect light of a virtually constant color at all temperatures below the trigger point. Above the trigger point temperature the material becomes transparent. Since the liquid crystal is usually used over a black background the effect is to change from a color below the trigger point temperature to black at temperatures above the trigger point temperature. The reflected color below the trigger point temperature can be of any color of the spectrum, but for maximum visibility green is recommended. The thermochromic sensor 32 can be made of only thermochromic liquid crystals, only monochromatic liquid crystals, or a mixture of thermochromic liquid crystals and monochromatic materials; however, the boundary lines seem especially suited to monochromatic liquid crystals, because the constant color would clearly mark the boundary line during play, but would change to black in the area of any ball contact.

FIG. 2 illustrates various configurations of the thermochromic sensor 32. FIG. 2A, shown for reference is a segment of a normal boundary line 34, which is normally about three inches wide. FIG. 2B is a segment of a boundary line with a thermochromic sensor on the boundary line and in bounds of the boundary line, including boundary line with thermochromic sensor 36 and in bounds thermochromic sensor 38. The boundary line with thermochromic sensor 36 would be the width of a normal line and have a background distinquishable from the court and in bounds thermochromic sensor 38. One way to form the boundary line with thermochromic sensor 36 is to use a single color, monochromatic liquid crystal to form the boundary line, which would maintain a constant color such as green unless there was a temperature change beyond the trigger point caused by a ball contact, for example. If the in bounds thermochromic sensor 38 uses thermochromic liquid crystals then it would normally be black and if boundary line with thermochromic sensor 36 uses monochromatic liquid crystals with the below trigger temperature point color of green, then boundary line with thermochromic sensor 36 would be green which would provide visible boundary lines. This configuration could be used along service line 16 with the in bound area being the DEUCE and ADD areas, the base line 12 with the in bound area being the Back Court area and on double side line 24 and double alley 26 with the in bound areas toward the center of the court.

FIG. 2C is a segment of a boundary line with a thermochromic sensor on the boundary line and out of bounds of the boundary line, including boundary line with thermochromic sensor 40 and out of bounds thermochromic sensor 42. The boundary line with thermochromic sensor 40 would be the width of a normal line and have a background distinquishable from the court and in bounds thermochromic sensor 38. The boundary line with thermochromic sensor 40 could be formed using the single color monochromatic liquid crystals in the same manner as for boundary line with thermochromic sensor 36. This configuration could be used along service line 16 with the in bound area being the DEUCE and ADD areas, the base line 12 with the in bound area being the Back Court area and on double side line 24 and double alley 26 with the out of bound areas away from the center of the court.

FIG. 2D is a segment of a boundary line with a thermochromic sensor on the boundary line and in bounds and out of bounds of the boundary line, including boundary line with thermochromic sensor 44, out of bounds thermochromic sensor 46 and in bounds thermochromic sensor 48. The boundary line with thermochromic sensor 44 could be formed using the single color monochromatic liquid crystals in the same manner as for boundary line with thermochromic sensor 36 and would be the normal width of the boundary line. This configuration could be used along all of the boundary lines service line 16, base line 12, center service line 18, double side line 24, and double alley 26. Along center service line 18, the other nonsymmetric patterns such as shown in FIGS. 2B and 2C could be used; however, because players are alternating serving into the DEUCE area and then into the ADD areas, the symmetric configuration of FIG. 2D is preferred for center service line 18.

Instead of the pattern of FIG. 2B, FIG. 2E is a segment of a wide thermochromic sensor boundary line extending in bounds 50. This pattern would be useful along some boundaries such as base line 12; however, it would be different to players used to seeing a normal width line. The last configuration is shown in FIG. 2F, which is a segment of a normal width thermochromic sensor boundary line 52. This would be of some use; however, if the ball is close to the line, but doesn't hit it, then the sensor by itself will not indicate whether the ball has landed in or out of bounds and the officials would have to rely on their observations.

For a tennis court, one preferred embodiment would be to select the thermochromic liquid crystal to have a small temperature range between red and blue-green. With a temperature control device the material would be kept at a temperature just below the red temperature. Then a tennis ball hitting the material would manifest a color between red and blue-green. The advantage of a small temperature range is that a thermochromic liquid crystal would make a full transition to a blue-green color, which is most visible to the human eye, with any ball contact.

If monochromatic liquid crystals, which reflect light of a virtually constant color at all temperatures below the trigger point temperature, are used, then the temperature control device would be set to keep the temperature just below the trigger point temperature. Monochromatic liquid crystals with a small temperature range would change color with any ball contact.

Another preferred embodiment is to have layers of thermochromic liquid crystals that each have a different red temperature point. The different red temperature points could be selected to overlap and then the layers stacked. If each layer has a 4 degree Celsius range between red and blue-green, which corresponds to a 7.2 degree Fahrenheit range, then to cover a span of about 40 degrees, say from 55 degrees Fahrenheit to 95 degrees Fahrenheit 6 layers of thermochromic liquid crystals would be used. To properly operate the temperature of the material must be kept below the lowest red temperature point, for example 55 degrees. Below the lowest red temperature point all of the layers of thermochromic crystals are transparent. The temperature control device maintains the temperatures of all the layers at a nearly constant temperature below the lowest red temperature point. When a ball hits the layers, then the rise in temperature caused by the ball impact raises one of the layers beyond the red temperature point and the layer turns a color between red and blue-green until the temperature control device returns the layers to the nearly constant temperature.

If the tennis court surface is far below the lowest red temperature point, then the temperature control device, such as temperature controller 68, must heat the layers to just below the lowest red temperature point. By using an insulator between the court and the layers, the effect of the court temperature on the operation of the layers can be minimized.

FIG. 3A shows a thermochromic sensor with temperature controller 60 including a strip of thermochromic sensor 62 and a temperature controller 68. The temperature controller 68 would operate from power input 70 and have the capability of measuring the ambient court temperature to determine the needed adjustment temperature. The temperature controller 68 would supply power to the temperature controller grid 72, shown in FIG. 3B via temperature control terminal 64 and temperature control terminal 66. FIG. 3C is a cross section showing layers of thermochromic sensor layers stacked on top of one another. In one preferred embodiment the stack would be the following starting at the bottom: court 74, insulator 84 that would provide temperature insulation between court 74 and the thermochromic sensor and that could include an adhesive for attachment to the court 74, temperature controller grid 72, thermochromic sensor layer 82, thermochromic sensor layer 80, thermochromic sensor layer 78, and thermochromic sensor layer 76. Each of the thermochromic sensor layers would have thermochromic liquid crystals with a different red color start temperature.

FIG. 3D is a cross section showing another preferred embodiment without any temperature controller grid 72. In this preferred embodiment the stack would be the following starting at the bottom: court 74, layer 96 that could include an insulator and an adhesive for attachment to the court 74, thermochromic sensor layer 94, thermochromic sensor layer 92, thermochromic sensor layer 90, thermochromic sensor layer 88 and thermochromic sensor layer 86. Again, each of the thermochromic sensor layers would have thermochromic liquid crystals with a different red color start temperature.

FIG. 3E is another preferred embodiment cross section with the stack being the following: court 74, insulator 84, temperature controller grid 72, and thermochromic sensor 98, which could be either a thermochromic liquid crystal sensor or a single color, monochromatic liquid crystal that would be especially useful for boundary lines.

FIG. 3F shows a preferred embodiment cross section with the temperature controller grid 72 buried under court 74. In this case the court is already temperature controlled and the thermochromic sensor 98, which could be either a thermochromic liquid crystal sensor or a single color, monochromatic liquid crystal that would be especially useful for boundary lines, can be placed directly on the court.

Figure 4A:
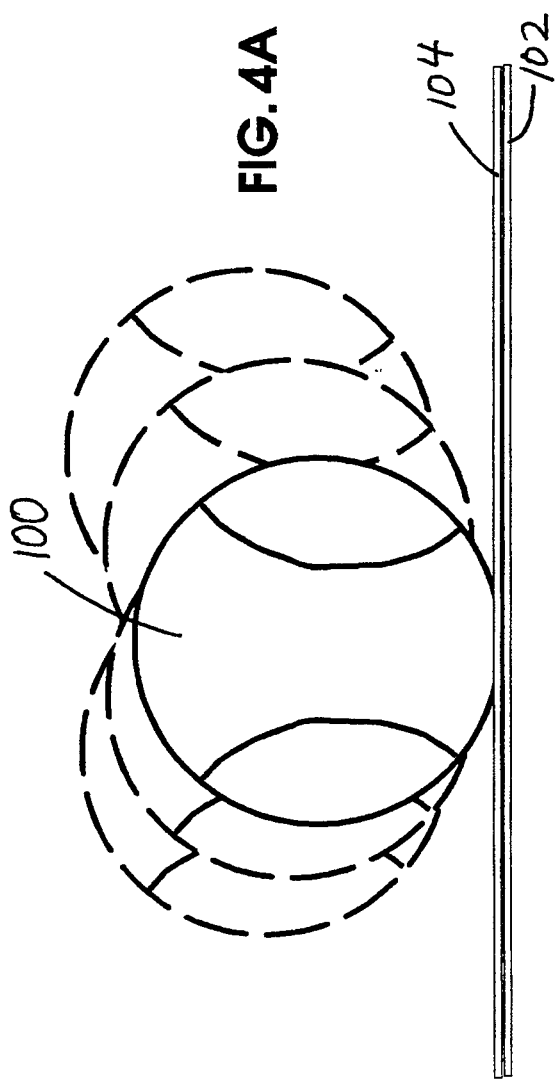
FIGS. 4A and 4B show a tennis ball striking a tennis court having a thermochromic sensor according to the present invention and the resulting chromic change of the thermochromic sensor.
Figure 4B:
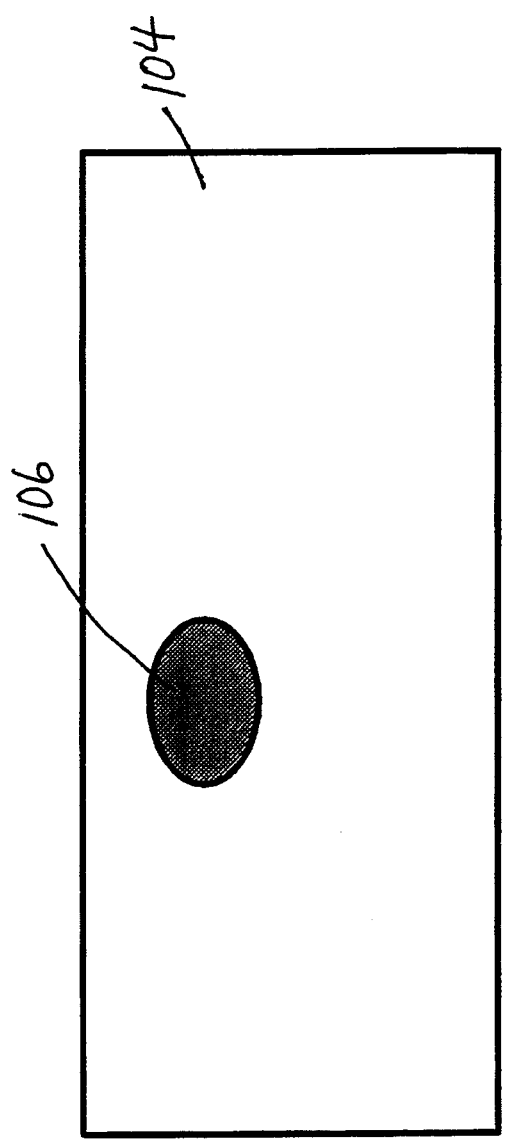

FIGS. 4A and 4B show the result of a tennis ball hitting the court. When a tennis ball 100 strikes a court 102 having a thermochromic sensor 104, then a visible color change spot in thermochromic sensor 106 is left in the thermochromic sensor 104 at the area of contact.

Throughout this description, a tennis court was used for an example game that requires boundary line calls thereby requiring area of contact location. Tennis is also a game in which the speed of impact is an interesting characteristic. There are many other uses of this capability of contact location and speed characterization, such as volleyball, racquet ball, squash and baseball. In general any situation where it is desired to locate the area of contact between surfaces moving relative to each other.

Figure 5B:
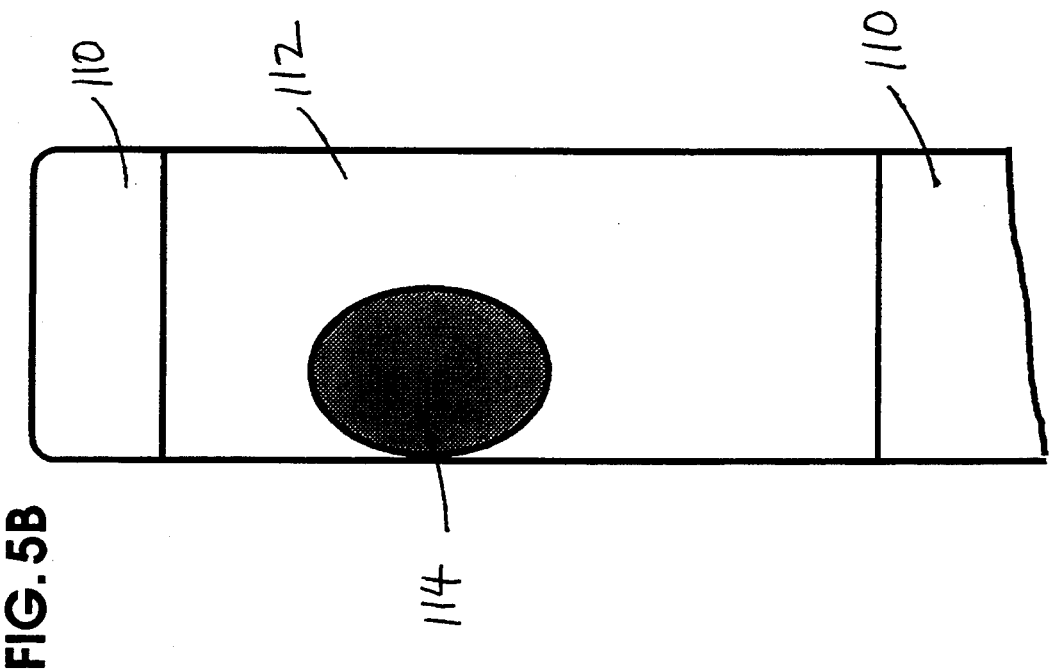
FIGS. 5A and 5B show a baseball striking a bat having a thermochromic sensor according to the present invention and the resulting chromic change of the thermochromic sensor.
Figure 5A:
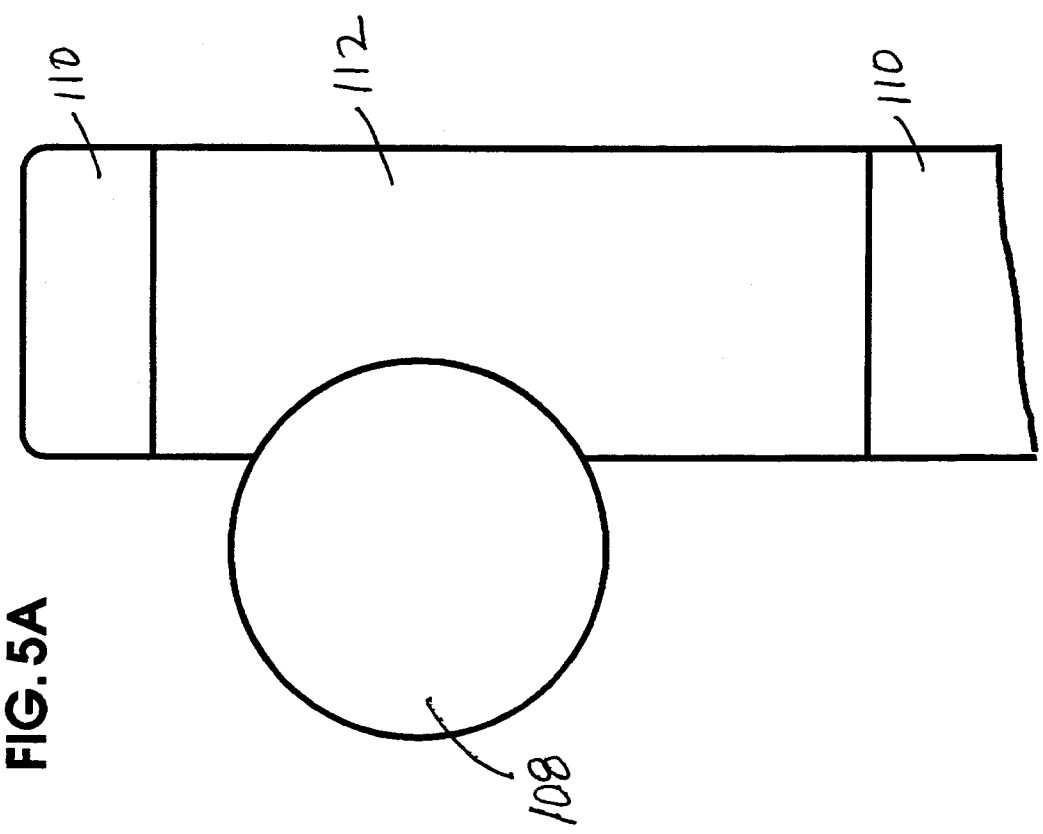

For example, the thermochromic sensor 32 could be placed on a bat to locate the area of contact where the ball struck the bat and possibly to characterize the speed of impact, as shown in FIGS. 5A and 5B. Here a thermochromic sensor 112 is placed over a bat 110 and then used to bat a baseball 108. After the ball is struck, a visible color change spot 114 is present in thermochromic sensor 112. This could be used to help baseball players understand where on the bat they are hitting the ball.

It is thought that the present invention and many of its attendant advantages will be understood from the foregoing description and it will be apparent that various changes may be made in the form, construction and arrangement of the parts thereof and in the methods used without departing from the spirit and scope of the invention or sacrificing all of its material advantages, the forms hereinbefore described being merely a preferred or exemplary embodiments thereof.

I claim:

1. A contact indicator for locating the area of contact of a moving object with a surface, the contact indicator comprising:

a thermochromic material covering said surface, said thermochromic material changing color in the area of thermochromic material contacted by the moving object, the color change caused by a rise in temperature in the area contacted due to friction between said moving object and said thermochromic material.

2. The contact indicator of claim 1 wherein said thermochromic material comprises:

at least one layer of thermochromic liquid crystals.

3. A speed indicator for measuring the speed of contact of a moving object with a surface comprising:

a thermochromic material covering said surface, said thermochromic material changing color in the area of thermochromic material contacted by the moving object, said color change caused by a rise in temperature caused by friction between said moving object and said thermochromic material, wherein a high speed moving object contacting the thermochromic material raises the thermochromic material in the area contacted to a first temperature causing the thermochromic material to change to a first color in the area of contact and wherein a low speed moving object contacting the thermochromic material raises the thermochromic material in the area contacted to a second temperature causing the thermochromic material to change to a second color in the area of contact.

4. The contact indicator of claim 2 wherein said thermochromic liquid crystals further comprise:

single color, monochromatic liquid crystals having a first color when below a first temperature and having a second color in the area of contact when the thermochromic material in the area of contact is raised above the first temperature by frictional contact between the thermochromic material and the moving object.

5. The contact indicator of claim 2 wherein said surface comprises a court for playing games.

6. The contact indicator of claim 5 wherein said court comprises a tennis court.

7. The contact indicator of claim 5 further comprising:

means for maintaining said thermochromic material at a nearly constant temperature affixed beneath said court to thermally isolate the court and the thermochromic material covering the court from an ambient temperature.

8. The contact indicator of claim 5 wherein the thermochromic material covers a boundary line on the court.

9. The contact indicator of claim 5 wherein the thermochromic material covers an area adjacent to a boundary line on the court.

* * * * *